C. DECKER.
Bee Hive.

No. 83,263.

Patented Oct. 20, 1868.

Witnesses
W. C. Ashkettle
Wm. A. Morgan

Inventor
C. Decker
Per Munn & Co
Attorneys

United States Patent Office.

CHARLES DECKER, OF NEW MICHIGAN, ILLINOIS.

Letters Patent No. 83,263, dated October 20, 1868.

IMPROVEMENT IN BEE-HOUSE.

The Schedule referred to in these Letters Patent and making part of the same.

*To all whom it may concern:*

Be it known that I, CHARLES DECKER, of New Michigan, in the county of Livingston, and State of Illinois, have invented a new and improved Bee-House; and I do hereby declare that the following is a full, clear, and exact description thereof, which will enable those skilled in the art to make and use the same, reference being had to the accompanying drawings, forming part of this specification.

This invention relates to a new and improved bee-house, and it consists in the means employed for suspending the comb-frames in the house, as hereinafter fully shown and described, whereby the frames may be fitted or suspended within the house and removed therefrom with the greatest facility.

Figure 1:
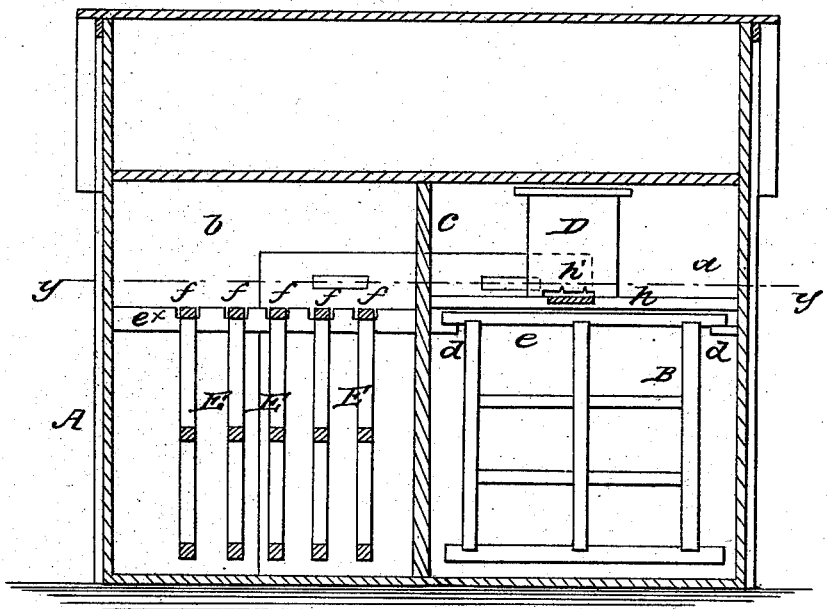
Figure 2:
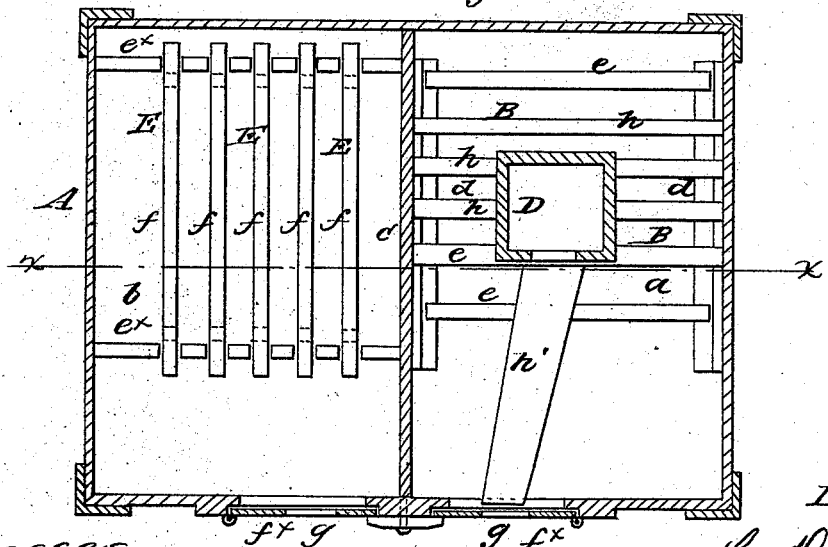

In the accompanying sheet of drawings,

Figure 1 is a vertical section of my invention, taken in the line $x\ x$, fig. 2.

Figure 2, a horizontal section of the same, taken in the line $y\ y$, fig. 1.

Similar letters of reference indicate corresponding parts.

A represents the bee-house, which may be constructed of any suitable dimensions, and divided into compartments $a\ b$, by a partition, $c$.

I prefer to construct the house about twelve feet long, eight feet wide, and about six feet in height, and to lath and plaster the same upon the inside.

These compartments should be a trifle wider than the comb-frames B, and to the sides of the compartment $a$, about two-thirds the height thereof from the bottom, there are nailed, or otherwise secured, horizontal strips $d\ d$, one to each side.

The upper cross-slats $e$ of the comb-frames B have their ends projecting beyond the sides to admit of the ends of the slats resting upon the strips $d\ d$, as shown clearly in fig. 1, the lower ends of the frames being a short distance above the bottom of the bee-house, as shown clearly in fig. 1.

By this means, any suitable number of comb-frames may be suspended within the compartment $a$, and, if desired, ordinary bee-hives, D, may be placed above them, and supported upon slats $h$, as shown in the drawings.

$h'$ is a wide slat, or board, placed above the comb-frames in the bee-house to guide the bees from the entrance $g$ to the hive D.

I design to employ this hive in transferring the new swarms of bees to the bee-house. It is not, therefore, permanently fixed within the house, but may be removed, when desired.

In the compartment $b$ there are secured two horizontal strips, $e^\times\ e^\times$.

These strips have a transverse position in the compartment $b$, and are notched at equal distances apart to receive the projecting ends of the upper-cross slats $f$ of the comb-frames E.

This arrangement is simply a modification of the one first described.

The bee-house is provided with doors, $f^\times\ f^\times$, through which the bee-entrances $g\ g$ are cut.

By this arrangement, the bees are perfectly well protected, both in summer and winter, and the comb-frames rendered very accessible for inspection and the removal of honey.

I claim as new, and desire to secure by Letters Patent—

The bee-house, constructed as described, and divided into compartments $a\ b$, by the central partition $c$, each compartment adapted to receive in its lower part the suspended comb-frames B E, above which the ordinary hive D is placed, supported on slats, $h$, and communicating with the entrance $g$ by means of the board $h'$, as herein shown and described.

CHARLES DECKER.

Witnesses:
    ALBERT D. WARD,
    ANDREW J. SONGER.